(12) United States Patent
Berryman Kent

(10) Patent No.: US 12,275,478 B2
(45) Date of Patent: Apr. 15, 2025

(54) MULTI-LAYERED PROTECTIVE COVER FOR TRANSPARENT VEHICLE BARRIERS

(71) Applicant: Elizabeth Berryman Kent, Richmond, VA (US)

(72) Inventor: Elizabeth Berryman Kent, Richmond, VA (US)

( * ) Notice: Subject to any disclaimer, the term of this patent is extended or adjusted under 35 U.S.C. 154(b) by 0 days.

(21) Appl. No.: 18/493,755

(22) Filed: Oct. 24, 2023

(65) Prior Publication Data

US 2024/0132174 A1 Apr. 25, 2024
US 2024/0227964 A9 Jul. 11, 2024

Related U.S. Application Data

(60) Provisional application No. 63/380,807, filed on Oct. 25, 2022.

(51) Int. Cl.

| | | |
|---|---|---|
| *B62J 23/00* | (2006.01) | |
| *B32B 3/08* | (2006.01) | |
| *B32B 5/02* | (2006.01) | |
| *B32B 27/08* | (2006.01) | |
| *B32B 27/12* | (2006.01) | |
| *B32B 27/34* | (2006.01) | |
| *B32B 27/36* | (2006.01) | |

(52) U.S. Cl.
CPC ............... *B62J 23/00* (2013.01); *B32B 3/08* (2013.01); *B32B 5/02* (2013.01); *B32B 27/08* (2013.01); *B32B 27/12* (2013.01); *B32B 27/34* (2013.01); *B32B 27/36* (2013.01); *B32B 2255/10* (2013.01); *B32B 2255/26* (2013.01); *B32B 2262/062* (2013.01); *B32B 2307/409* (2013.01); *B32B 2307/412* (2013.01); *B32B 2307/71* (2013.01); *B32B 2307/7265* (2013.01); *B32B 2571/00* (2013.01); *B32B 2605/00* (2013.01)

(58) Field of Classification Search
CPC ... B62J 23/00; B32B 3/08; B32B 5/02; B32B 27/12; B32B 27/34; B32B 27/36
USPC .......................................................... 150/167
See application file for complete search history.

(56) References Cited

U.S. PATENT DOCUMENTS

| | | | |
|---|---|---|---|
| 9,027,995 B2 * | 5/2015 | SanCartier .............. | B62J 19/00 297/219.11 |
| 10,035,412 B2 * | 7/2018 | Garnick .................. | B60J 11/04 |
| 11,292,541 B2 * | 4/2022 | Dooling .................. | B62J 19/00 |
| 11,529,858 B1 * | 12/2022 | Guma ...................... | E06B 9/42 |
| 11,591,035 B2 * | 2/2023 | Forshaw .................. | B62J 19/00 |

(Continued)

*Primary Examiner* — Sue A Weaver
(74) *Attorney, Agent, or Firm* — Pierce Mooney

(57) ABSTRACT

A protective cover designed for transparent barriers, such as those found on vehicles. The cover comprises two panels, each constructed from multiple layers that can include polymeric materials and coatings. These layers can be tailored to exhibit visual changes under varying lighting conditions or be constructed from iridescent fabrics. The cover and one or more optional aesthetic elements can be customized based on user input. An extender mechanism, equipped with specific attachment features, ensures adaptability for different barrier sizes. The design incorporates features like elastic elements and optional piping for a precise fit and augmented positional stability. The cover offers protection against environmental factors, including UV light, moisture, and debris, while also being easily installable and removable.

15 Claims, 5 Drawing Sheets

(56) References Cited

U.S. PATENT DOCUMENTS

2018/0345058 A1* 12/2018 Walker ............... A62C 8/06
2021/0214034 A1* 7/2021 Skinner ............... B62J 17/10

* cited by examiner

MULTI-LAYERED PROTECTIVE COVER FOR TRANSPARENT VEHICLE BARRIERS

CROSS-REFERENCE TO RELATED APPLICATIONS

This application claims the benefit of U.S. Provisional Application No. 63/380,807, filed on 2022 Oct. 25, entitled "Cycle Bike Sun Shield".

BACKGROUND OF THE INVENTION

Field of the Invention

The present disclosure pertains to the field of vehicle accessories, particularly to a versatile, multi-layered protective cover designed for transparent barriers such as motorcycle windshields. More specifically, the disclosure encompasses a customizable and durable cover that offers enhanced aesthetic elements and adaptive fitment to accommodate various shapes and sizes of transparent barriers.

Description of Related Art

Motorcycles are enjoyed for their mobility and unique riding experience and are utilized by numerous individuals for daily commuting and recreational riding. A critical component of motorcycles, the windshield, was initially devised to protect riders from insects and minor debris during their journeys. These windshields, manufactured from a variety of materials, including acrylic and polycarbonate, have been developed to enhance the rider's comfort and safety by mitigating wind resistance and deflecting environmental elements.

However, a common issue with motorcycle windshields is their vulnerability to environmental damage, especially from prolonged exposure to ultraviolet (UV) light or UV rays from the sun. Such exposure can lead to undesirable fading and discoloration, which not only detracts from the motorcycle's aesthetic appeal but can also potentially compromise visibility through the windshield, thereby indirectly affecting rider safety.

There exists a need for an effective and economical product and method for protecting the motorcycle windshield from degradation and damage.

Moreover, the description herein of any disadvantages associated with the described products, methods, and/or apparatus, is not intended to limit the embodiments. Indeed, some aspects may include certain features of the described products, methods, and/or apparatus without suffering from their described disadvantages.

SUMMARY OF THE INVENTION

In various aspects, the disclosure provides a cover for a transparent barrier, which includes a first panel and a second panel. The first panel includes a first layer and a second layer, with the peripheries of these layers being operatively affixed to each other. The second panel may include an optional third layer and a fourth layer, with the optional third layer, when present, being operatively affixed to the fourth layer. The first panel is operatively connected to the second panel along their peripheries, forming a connection that includes an opening to facilitate the placement and removal of the cover over the transparent barrier. The layers may independently and optionally include a polymeric material and/or a polymeric material with a polymer coating.

In some aspects, each layer independently includes a material selected from a variety of materials, such as a natural material, a synthetic material, a natural polymer, a synthetic polymer, a natural fiber, a synthetic fiber, and combinations thereof. The material may be coated or uncoated and may include a four-way stretch capability.

In another aspect the first layer includes a fabric capable of exhibiting a visually perceptible change in color or luminance when viewed from different angles or lighting conditions. In some aspects, the first layer is an iridescent fabric.

In various aspects, the first layer, the second layer, the optional third layer, and the fourth layer independently include a material designed to prevent or reduce damage to the transparent barrier. In some aspects, the second layer and optional third layer include a vinyl coated polyester.

In some aspects, the second panel includes a fabric selected from polyester, elastane, cotton, vinyl coated polyester, and combinations thereof. In some aspects, the second layer of the first panel and the optional third layer of the second panel are independently cotton, polyester, nylon, or combinations thereof.

In some aspects, the polymer coating on at least one of the first layer, second layer, optional third layer, or fourth layer is a polymer of vinyl and/or urethane. In another aspect the second layer of the first panel includes a first attachment feature configured to selectively engage with an extender mechanism, which is adapted to adjust one or more dimensions of the cover to accommodate differently sized transparent barriers of a vehicle.

In various aspects, the extender mechanism includes a first extender layer and a second extender layer, with the first extender layer including a second attachment feature configured to selectively engage with the first attachment feature on the second layer. The second extender layer is configured to prevent damage to the transparent barrier.

In some aspects, the extender mechanism is selectively attachable to the second layer of the first panel via a plurality of attachment mechanisms selected from hook and loop fasteners, snaps, buttons, zippers, ties, elastic bands, magnetic closures and combinations thereof.

In some aspects, the first layer of the first panel further includes an aesthetic element, formed from a variety of materials, and may be coated or uncoated. The aesthetic element may be custom-designed based on user-provided input and/or measurements, which includes a design, logo, or other aesthetic indicia provided by a user in various forms.

In various aspects, at least one of the first layer, second layer, optional third layer, and fourth layer includes a material and/or coating which prevents or resists degradation from environmental factors including ultraviolet (UV) light, moisture, and airborne debris and/or vandalism.

In some aspects, the second panel has a top portion and a bottom portion, with the top portion located distal to an opening formed by the bottom portion, and one or more elastic features disposed along a section of the bottom portion. The one or more elastic features are positioned proximal to a first side edge and a second side edge of the second panel and does not extend across the entirety of the bottom portion, thereby forming a non-elasticized central portion along the bottom portion of the second panel.

In other aspects, the one or more elastic features are configured to secure the cover to the transparent barrier, maintain positional stability of the cover during use, and enable simplified placement and removal of the cover by providing adaptive fitment to various transparent barrier shapes and sizes.

In some aspects, the cover is custom-fit to a transparent barrier by utilizing user-provided input and/or measurements of the transparent barrier to tailor the first and second panels, ensuring a precise fit to the transparent barrier.

In various aspects, the disclosure provides a method for protecting a transparent barrier of a vehicle which includes providing the cover and placing the cover over the transparent barrier utilizing the opening formed by the operative connection between the first panel and the second panel, where the one or more elastic features facilitate rapid, accurate and/or efficient placement and removal of the cover. In some aspects, the disclosure provides an option for leaving the cover placed over the transparent barrier for a user-determined quantity of time, where the transparent barrier may be protected in full or in part from environmental conditions or elements. In some aspects, the disclosure expands the method to include removing the cover from the transparent barrier utilizing the opening formed by the operative connection between the first panel and the second panel, wherein the one or more elastic features facilitate rapid and/or efficient removal of the cover,

BRIEF DESCRIPTION OF THE SEVERAL VIEWS OF THE DRAWINGS

The drawings illustrate generally, by way of example, but not by way of limitation, various aspects discussed in the present document.

DETAILED DESCRIPTION OF THE INVENTION

Figure 1A:
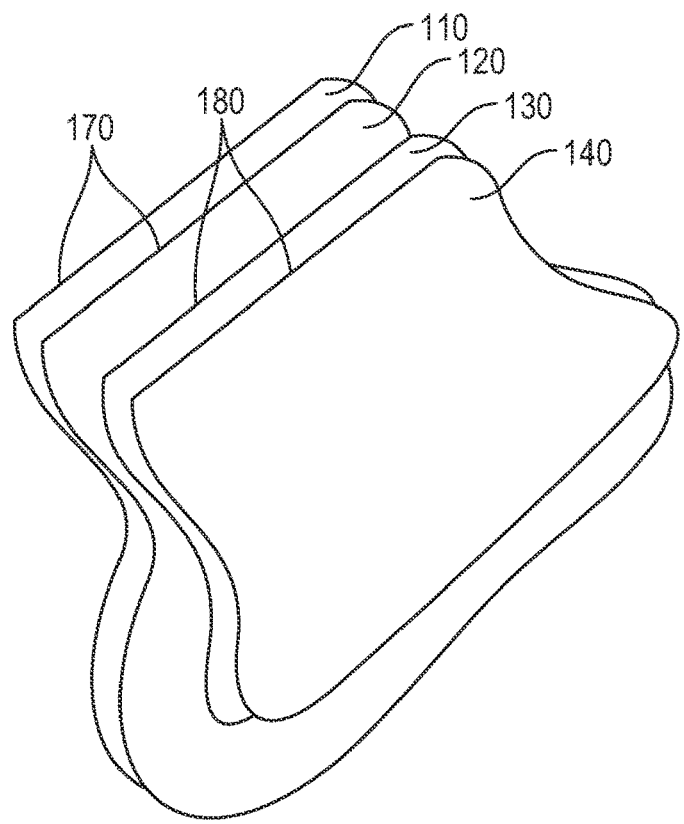
FIG. 1A shows an isometric expanded view of the present disclosure.

As used herein, the terms "a" or "an" are used, as is common in patent documents, to include one or more than one independent of any other instances or usages of "at least one" or "one or more."

As used herein, the term "and/or" is meant to be both inclusive and exclusive, such that "A and/or B" includes "A but not B," "B but not A," and "A and B," unless otherwise indicated.

As used herein, the term "about" refers to an amount that is approximately, nearly, almost, or in the vicinity of being equal to or is equal to a stated amount.

References in the specification to "aspect" or "aspects" indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

As used herein, the term "aesthetic element" refers to a distinct component or feature characterized by its visual appeal or design. An aesthetic element encompasses graphics, signage, finish, color, texture, decoration, furnishings, fixtures, and artwork, among others. An aesthetic element may serve to enhance the appearance, attractiveness, or visual perception of an object or structure to which it is associated. Such an element may be characterized by its shape, color, pattern, texture, or any combination thereof. While primarily serving a decorative or ornamental purpose, the aesthetic element may be integral to or separable from the main structure and may or may not have functional attributes beyond its visual contribution.

As used herein, the term "attachment feature" refers to any structural or functional element, component, or means designed to facilitate the connection, joining, or affixation of one object or material to another, enabling secure, adjustable, and potentially reversible attachment.

As used herein, the term "barrier" refers to a material that controls the permeability of one or more elements including, but not limited to, moisture, chemicals, heat, odor, and oxygen or other gases. Additionally, a barrier can also serve to shield against or mitigate the effects of various environmental conditions such as UV radiation, wind, rain, dust, and temperature fluctuations.

As used herein, the term "cover" refers to the function and/or one or more structures or components designed to overlay and shield a specific area or object, thereby preventing or restricting direct access to or interaction with that area or object."

As used herein, the term "edge" refers to a boundary or limit of a surface, often characterized by a line or point where two surfaces meet. An edge can demarcate the transition from one face of an object to another and can be linear, curved, or of a more complex geometry. In various contexts, an edge may serve functional, structural, or aesthetic purposes, and its properties, such as sharpness, thickness, or profile, can vary based on the design and intended application of the associated object or structure. An edge can include various functional, structural, or aesthetic elements to emphasize the edge or add support to the edge.

As used herein, the term "layer" refers to a distinct material portion characterized by a defined thickness. A layer may be continuous, extending over the entirety of an underlying or overlying surface, or may be discontinuous, spanning only a portion of such surface. Each layer independently may be differentiated from adjacent materials or surfaces based on composition, properties, function, or orientation. Layers can be juxtaposed, superimposed, or interspersed, and may be separable or integrally formed with adjacent layers.

As used herein, the term "mechanism" refers to a system, device, or assembly of components designed to perform or facilitate a specific function, operation, or series of movements.

As used herein, the term "opening" refers to a void, gap, or space formed within or through a structure, facilitating access, passage, or visibility between its interior and exterior or between two distinct regions. An opening can be naturally occurring, intentionally created, or result from the removal or absence of material, and may possess any shape, size, or orientation.

As used herein, the term "operative connection" refers to a functional linkage or association between two or more components, elements, or parts, enabling them to work in concert or achieve a desired outcome. This connection can be permanent or temporary, direct or indirect, and may be achieved through various means including, but not limited to, mechanical fastenings, adhesives, interlocking features, or magnetic forces, sewing, stitching, or other textile joining techniques. The operative connection ensures that the components, when connected, perform their intended function or operation in the context of the overall system or assembly, As used herein, the term "panel" refers to sections of the main body wherein the section is bounded by folds, curves, seams, and/or edges. A panel has a first edge-side and a second edge-side, which refer to the lateral boundaries of the panel. A panel may include one or more layers, each of which can have an extent less than the extent of the total structure of the panel, As used herein, the term "periphery" refers to the outermost boundary, edge, or contour of an object, structure, or region, distinguishing the main body or central portion from its surrounding area.

As used herein, the term "portion" refers to a specific part or segment of a larger whole, which may be defined by spatial, functional, or material characteristics. A portion may represent a fraction of the entirety, ranging from a minimal segment to the complete entity or nearly the complete entity, and may be delineated by boundaries, features, or other distinguishing criteria.

As used herein, the term "seam" refers to the junction or line formed by the joining of two edges or surfaces, especially when secured together by a method such as stitching, welding, gluing, or the like, intended to provide a continuous, often strengthened, union between the joined components.

As used herein, "section" refers to a distinct or designated portion or subdivision of a larger whole, which can vary in extent from having no presence of the referenced attribute to encompassing the entirety of the referenced entity.

As used herein, the term "sewing" refers to the process or technique of joining, fastening, or attaching two or more materials or components together using a thread or similar filament, typically by means of a needle or a machine adapted for such purpose, resulting in a line or pattern of stitches that secure and unify the joined elements.

As used herein, the term "vehicle" is defined broadly as a means of carrying or transporting something. Types of vehicles which may be disclosed herein include, by way of non-limiting example, automobiles, trucks, buses, trains, recreational vehicles, boats, aircraft, spacecraft, motorcycles, ATV's (All-terrain vehicles), UTV's (utility task vehicles), and the like.

Reference will now be made in detail to some aspects of the disclosed subject matter, examples of which are illustrated in the accompanying descriptions and figures. While the disclosed subject matter will be described in conjunction with the enumerated claims, it will be understood that they are not intended to limit the disclosed subject matter to those claims. On the contrary, the disclosed subject matter is intended to cover all alternatives, modifications and equivalents, which may be included within the scope of the presently disclosed subject matter as defined by the claims.

Figure 1B:
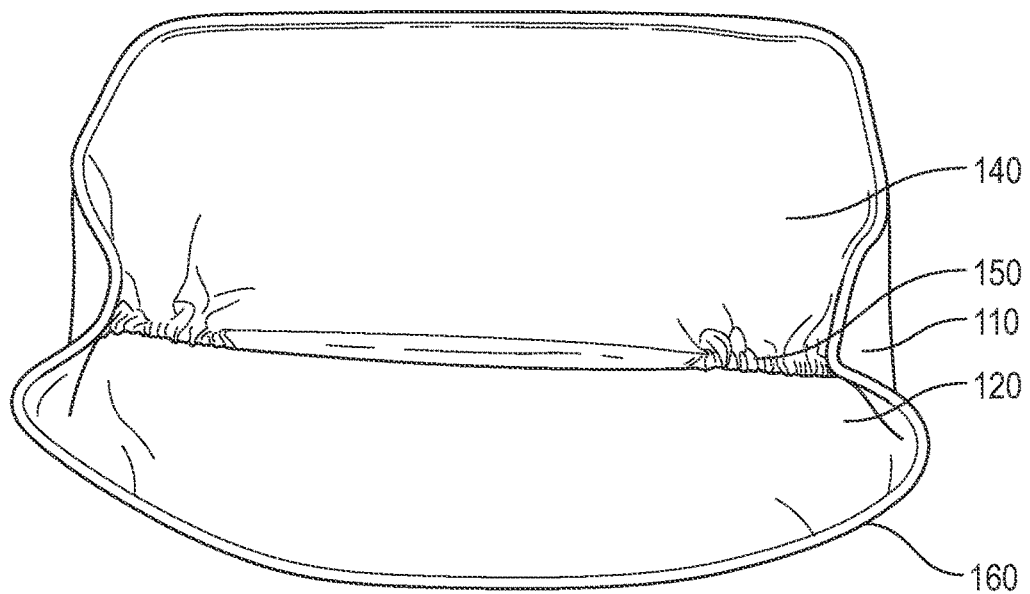
FIG. 1B shows a rear view of the present disclosure.

Referring now to the drawings, wherein the drawings are for purposes of illustrating some aspects of the present disclosure only, and not for purposes of limiting the same and wherein like reference numerals designate identical or corresponding parts throughout the several views, and referring particularly to FIGS. 1A and 1B, an exemplary cover for a transparent barrier is depicted.

FIG. 1A provides an expanded schematic drawing showing the orientation of the first panel (170), including the first layer (110) and the second layer (120), relative to the second panel (180), including the optional third layer (130) and the fourth layer (140). In this figure, the second panel (180) is shown slightly offset from the first panel (170) for clarity of viewing. In some aspects, the two panels overlap in registration with one another and are operatively affixed as shown in FIG. 1B. In some aspects, the first panel (170) may be longer than the second panel (180). In some aspects, the first panel (170) may be the same length as the second panel (180). In other aspects, the first panel (170) and the second panel (180) may have a similar shape. In other aspects, the first panel (170) and the second panel (180) may have similar widths. In another aspect the first panel (170) and the second panel (180) may have the same width. In some aspects, the first panel (170) and the second panel (180) may be Interchangeable.

FIG. 1B is a drawing showing the transparent barrier cover where the first panel (170) and second panel (180) have been operatively affixed. The first panel (170) includes a first layer (110) and a second layer (120), while the second panel (180) includes an optional third layer (130, not shown in this drawing) and a fourth layer (140).

In some aspects, the periphery of the first layer (110) may be operatively affixed to the periphery of the second layer (120), forming the first panel (170). In some aspects, the periphery of the optional third layer (130) may be operatively affixed to the periphery of the fourth layer (140), forming the second panel (180). In various aspects, the periphery of the first panel (170) may be operatively affixed to the periphery of the second panel (180) forming the cover of the present disclosure. In some aspects, any panel and any layer may be operatively affixed to any other panel or any other layer in any order and using any method or any procedure known in the art.

In some aspects, the term "operatively affixed" as utilized herein encompasses a multitude of methods for securing the layers and panels together, thereby creating a structurally sound construction. Operative affixing may include but is not limited to sewing, gluing, taping, employing adhesive or sealant layers, utilizing a melting process to amalgamate the fabrics, stitching, welding, riveting, snap fastening, buttoning, zipping, hook and loop fastening, bonding, laminating, tying, magnetic fastening, pinning, buckling, taping, grommeting, Velcro strapping, clipping, toggle fastening, basting, fusing and combinations thereof.

In various aspects, the edges of the fabric layers might be enhanced and stabilized using a structural element including but not limited to piping, cording, welting and other similar stabilizing features known in the art and combinations thereof. This structural element may impart additional structural integrity, may safeguard against material fraying, and potentially may augment the aesthetic of the cover by creating a finished appearance to its edges. In some aspects, piping (160) may be operatively affixed along the periphery of the first panel (170). In some aspects, piping (160) may be operatively affixed along the periphery of the second panel (180). In some aspects, piping (160) may be affixed along the periphery of the first panel (170) and the second panel (180). In other aspects, the piping (160) may be affixed between the first panel (170) and the second panel (180), specifically along the periphery of the first panel (170) and the second panel (180).

In some aspects, the first layer (110) and second layer (120) may be overlaid in registration with one another. In other aspects, piping (160) or a similar element may be placed proximal to the periphery of said overlaid first layer (110) and second layer (120). In some aspects, an operative amount of fabric may extend beyond the piping (160) in order to fold said first layer (110) and second layer (120) over the piping (160). In some aspects, the peripheral portion of the overlaid first layer (110) and second layer (120) may be folded over the piping (160). In other aspects, the overlaid first layer (110) and second layer (120) may be operatively affixed proximal to the internal edge of the piping (160), thereby establishing a seam proximal to the piping (160). In some aspects, the piping (160) edge along the periphery of the panels may impart structural integrity to the cover. In other aspects, the piping (160) may impart a finished aesthetic look. In some aspects, the first layer (110) and second layer (120) may initially be operatively affixed together. In some aspects, the two affixed layers, the first layer (110) and second layer (120), may subsequently be folded over the piping (160). In other aspects, the two affixed layers, the first layer (110) and second layer (120), folded over the piping (160) may then be subjected to an additional affixing process adjacent to the piping (160) to create a finished look with improved structural support. In some aspects, the piping (160) may be optional and may not be incorporated into the construction.

In some aspects, a piece of piping (160) may be affixed along the periphery of the first layer (110) and the periphery of the second layer (120), wherein the first layer (110) and the second layer (120) may be in registration with one another. In some aspects, the piping (160) may be affixed along the periphery of the first layer (110) and second layer (120), specifically located between the first layer (110) and second layer (120). In some aspects, the piping (160) may be located proximal to the periphery of the first layer (110) and the periphery of the second layer (120). In further aspects, the peripheral portion of the overlaid first layer (110) and second layer (120) may be folded around the piping (160). In some aspects, the overlaid first layer (110) and second layer (120) may be folded around the piping (160) may provide additional support and stability to the cover. In other aspects, the overlaid fabric may be sewn proximal to the internal edge of the piping (160), thereby establishing a seam proximal to the piping (160). In some aspects, the piping (160) edge along the periphery of the panels may impart structural Integrity to the cover. In other aspects, the piping (160) may impart a finished aesthetic look.

In some aspects, the optional third layer (130) and fourth layer (140) may be overlaid in registration with one another. In other aspects, piping (160) or a similar element may be placed proximal to the periphery of said overlaid optional third layer (130) and fourth layer (140). In some aspects, an operative amount of fabric may extend beyond the piping (160) in order to fold said fabric over the piping (160). In further aspects, the peripheral portion of the overlaid fabrics may be folded over the piping (160). In other aspects, the fabric may be operatively affixed proximal to the internal edge of the piping (160), thereby establishing a seam or any other affixing methods known in the art proximal to the piping (160). In some aspects, the piping (160) edge along the periphery of the first panel (170) and the second panel (180) may impart structural integrity to the cover. In other aspects, the piping (160) may impart a finished aesthetic look. In some aspects, the optional third layer (130) and fourth layer (140) may initially be operatively affixed together. In some aspects, the two affixed layers, the optional third layer (130) and fourth layer (140), may subsequently be folded over the piping (160). In other aspects, the two affixed layers, the optional third layer (130) and fourth layer (140), folded over the piping (160) may then be subjected to an additional affixing process adjacent to the piping (160) to create a finished look with improved structural support. In some aspects, the piping (160) may be optional and may not be incorporated into the construction, In some aspects, a piece of piping (160) may be affixed along the periphery of the optional third layer (130) and the periphery of the fourth layer (140), wherein the optional third layer (130) and the fourth layer (140) may be in registration with one another. In some aspects, the piping (160) may be affixed along the periphery of the optional third layer (130) and the fourth layer (140), specifically located between the optional third layer (130) and the fourth layer (140). In some aspects, the piping (160) may be located proximal to the periphery of the optional third layer (130) and the fourth layer (140). In further aspects, the peripheral portion of the overlaid optional third layer (130) and fourth layer (140) may be folded around the piping (160). In other aspects, the fabric may be sewn proximal to the internal edge of the piping (160), thereby establishing a seam proximal to the piping (160). In some aspects, the piping (160) edge along the periphery of the panels may impart structural integrity to the cover. In other aspects, the piping (160) may impart a finished aesthetic look.

Figure 2A:
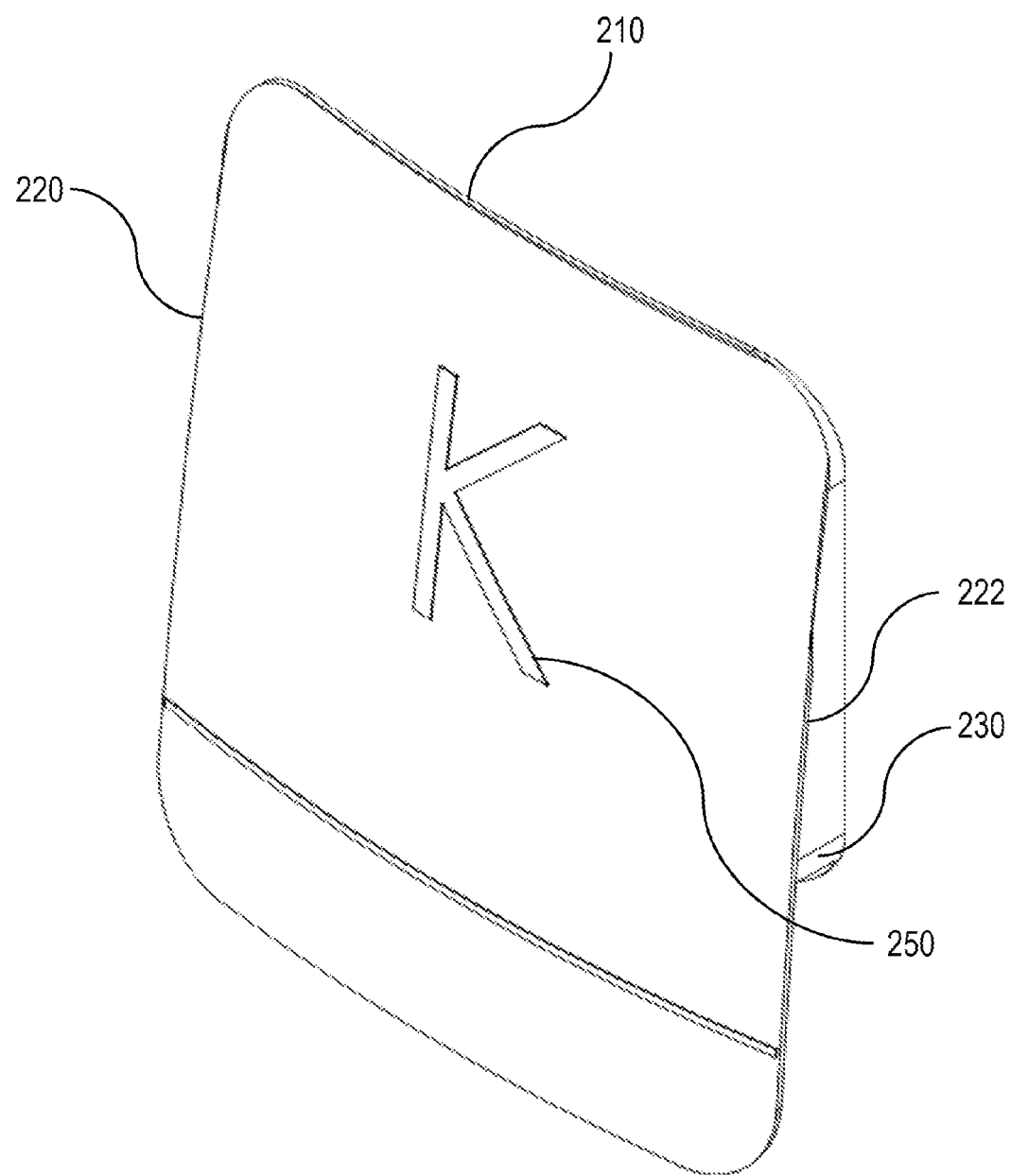
FIG. 2A shows an Isometric view of the present disclosure.
Figure 2B:
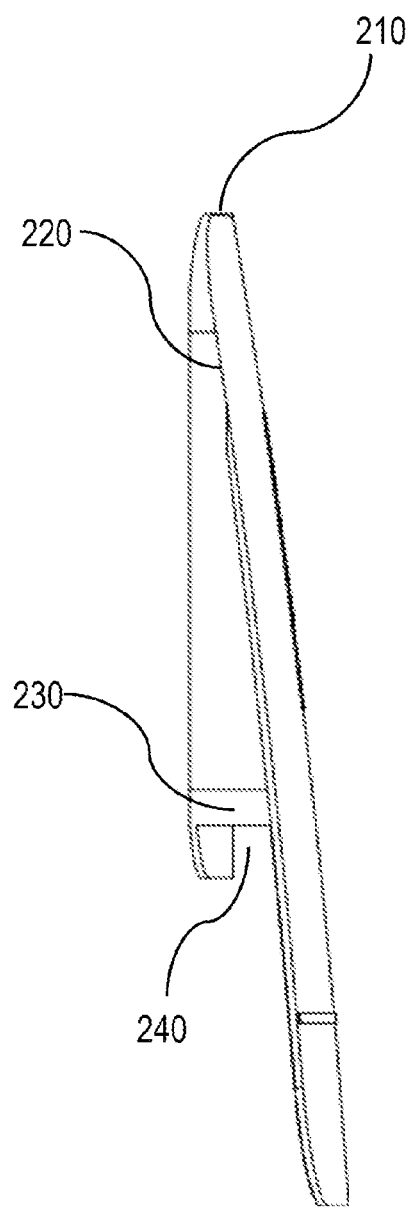
FIG. 2B shows a profile view of the present disclosure.

In some aspects, the first panel (170) and the second panel (180) may be operatively affixed along the periphery of each panel. As shown in FIG. 2A and FIG. 2B, in some aspects, the first panel (170) and the second panel (180) each have a top portion (210) where the two panels are operatively affixed. In some aspects, this top portion includes piping (160). In other aspects, the first panel (170) and the second panel (180) each have one or more side edges (220) where the two panels are operatively affixed. In other aspects, the first panel (170) and the second panel (180) have a bottom portion located distally from the top portion (210) where the two panels may be partially operatively affixed at the bottom of the side edge (230). In some aspects, portions of the first panel (170) and the second panel (180) may not be operatively affixed, creating an opening (240) to accommodate the transparent barrier and allowing rapid, accurate and/or efficient placement and rapid and/or efficient removal of the cover over the transparent barrier. In various embodiments the first panel (170) and/or the second panel (180) may include an aesthetic element (250) as described herein.

In some aspects, a piece of piping (160) may be affixed along the periphery of the first panel (170) and the periphery of the second panel (180). In some aspects, the first panel (170) and the second panel (180) may be overlaid in registration with one another. In some aspects, the piping (160) may be placed along the periphery of said overlaid panels. In some aspects, the piping (160) may be affixed along the periphery of the first panel (170) and the second panel (180), specifically located between the first panel (170) and the second panel (180). In some aspects, the piping (160) may be located proximal to the periphery of the first panel (170) and the second panel (180). In further aspects, the peripheral portion of the overlaid fabrics may be folded around the piping (160). In some aspects, the overlaid first panel (170) and the second panel (180) may be folded around the piping (160) and may provide additional support and stability to the cover. In other aspects, the fabric may be sewn proximal to the internal edge of the piping (160), thereby establishing a seam proximal to the piping (160). In some aspects, the piping (160) edge along the periphery of the panels may impart structural integrity to the cover. In other aspects, the piping (160) may impart a finished aesthetic look. In some aspects, the piping (160) may be optional and may not be incorporated into the construction.

In some aspects, the first panel (170) and the second panel (180) may be overlaid, wherein no layers have been operatively affixed. In other aspects, piping (160) or a similar element may be placed proximal to the periphery of said overlaid layers. In some aspects, an operative amount of fabric may extend beyond the piping (160) in order to fold said fabric over the piping (160). In further aspects, the peripheral portion of the overlaid optional third layer (130) and fourth layer (140) may be folded over the piping (160). In other aspects, the four fabric layers may be sewn proximal to the internal edge of the piping (160), thereby establishing a seam proximal to the piping (160). In some aspects, the piping (160) edge along the periphery of the panels may impart structural integrity to the cover. In other aspects, the piping (160) may impart a finished aesthetic look.

As shown in FIG. 1B, the second panel (180) may include one or more elastic features (150). In some aspects, the one or more elastic features (150) may be operatively affixed between the optional third layer (130) and the fourth layer (140) of the second panel (180). In some aspects, the one or more elastic features (150) may be operatively affixed on top of an overlaid in registration optional third layer (130) and fourth layer (140) of the second panel (180). In various aspects, said overlaid optional third layer (130) and fourth layer (140) may then be folded over the one or more elastic features (150), wherein the one or more elastic features (150) may be operatively affixed to the two layers. In various aspects, the one or more elastic features disposed along a section of the bottom portion of the second panel (180) may be positioned proximal to a first side edge (220) and a second side edge (222).

In some aspects, the one or more elastic features (150) may be operatively affixed from at least one of the first side edge (220) and/or the second side edge (222) to approximately about 1, 2, 5, 10, 15, 20, 25, 30 cm away from said first side edge (220) and/or the second side edge (222). In some aspects, one or more elastic features (150) may be operatively affixed from at least one of the first side edge (220) and/or the second side edge (222) to approximately about less than 1, less than 5, less than 10, less than 15, less than 20, less than 25, less than. 30 cm in the medial direction away from said first side edge (220) and/or the second side edge (222). In some aspects, one or more elastic features (150) may be operatively affixed from at least one of the first side edge (220) and/or the second side edge (222) to approximately about 1-5, 5-10, 10-15, 15-20, 20-25, 25-30 cm in the medial direction away from said first side edge (220) and/or the second side edge (222). In some aspects, one or more elastic features (150) may be operatively affixed from at least one of the first side edge (220) and/or the second side edge (222) to greater than 30 cm in the medial direction away from said first side edge (220) and/or the second side edge (222).

In some aspects, one or more elastic features (150) may be operatively affixed from the first side edge (220) to approximately about 1, 2, 5, 10, 15, 20, 25, 30 cm away from the first side edge (220). In some aspects, one or more elastic features (150) may be operatively affixed from the first side edge (220) to approximately about less than 1, less than 5, less than 10, less than 15, less than 20, less than 25, less than 30 cm in the medial direction away from the first side edge (220). In some aspects, one or more elastic features (150) may be operatively affixed from the first side edge (220) to approximately about 1-5, 5-10, 10-15, 15-20, 20-25, 25-30 cm in the medial direction away from the first side edge (220). In some aspects, one or more elastic features (150) may be operatively affixed from the first side edge (220) to greater than 30 cm in the medial direction away from the first side edge (220).

In some aspects, one or more elastic features (150) may be operatively affixed from the second side edge (222) to approximately about 1, 2, 5, 10, 15, 20, 25, 30 cm away from the second side edge (222). In some aspects, one or more elastic features (150) may be operatively affixed from the second side edge (222) to approximately about less than 1, less than 5, less than 10, less than 15, less than 20, less than 25, less than 30 cm in the medial direction away from the second side edge (222). In some aspects, one or more elastic features (150) may be operatively affixed from the second side edge (222) to approximately about 1-5, 5-10, 10-15, 15-20, 20-25, 25-30 cm in the medial direction away from the second side edge (222). In some aspects, one or more elastic features (150) may be operatively affixed from the second side edge (222) to greater than 30 cm in the medial direction away from the second side edge (222).

In some aspects, one or more elastic features (150) are disposed along a section of the bottom portion of the second panel (180), wherein the one or more elastic features (150) may be positioned proximal to a first side edge (220) and a second side edge (222) of the second panel (180). In various aspects, one or more elastic features (150) may not extend across the entirety of the bottom portion, wherein a non-elasticized central section along the bottom portion of the second panel (180) may be formed. In some aspects, the one or more elastic features may provide adaptive fitment of the present cover on or over the transparent barrier. As used herein, a "section" may denote any part of the panel ranging from having no elastic to its complete extent being elasticated, wherein specific features or attributes, such as the presence or absence of elastic, may be localized or distributed.

In some aspects, the one or more elastic features (150) may be custom designed with varying lengths to ensure a precise fit and adaptability of the present cover over the transparent barrier. In some aspects, the presence of one or more elastic features (150) may allow the present cover to conform precisely to the contours of the transparent barrier. In various aspects, this precise fit may ensure the present cover remains securely in place, even under adverse conditions. In some cases, the presence of one or more elastic features (150) may allow the present cover to be easily placed on and removed from the transparent barrier. In various aspects, one or more elastic features (150) may not be present on any panel.

In aspects where piping or a similar element is present and when said piping or similar is disposed along the first side edge (220) and/or the second side edge (222), various aspects may include attaching one or more elastic features (150) to said piping or similar element. In various aspects, attaching one or more elastic features (150) to piping or similar disposed along the first side edge (220) and/or the second side edge (222) may enhance the durability and provide additional structural support to the present cover. In some aspects, enhanced durability and additional structural support may cause the present cover to experience a more precise fit, augmented positional stability and a retention of its intended shape and positioning over extended use, In various aspects, the second panel (180) may be constructed from a fabric which is or appears to be a single layer. In aspects where the second panel (180) is a single layer of fabric, the optional third layer (130) may not be present. In some aspects, the first side of the fabric may exhibit a metallic appearance. This metallic-looking side may be composed of a blend of 50%, 60%, 70%, 80%, 90%, 95%, 100%, 10%-100%, 20%-90% polyester and 50%, 40%, 30%, 20%, 10%, 5%, 0%, 90%-0%, 80%-10% elastane. In other aspects, the second side of the fabric may present a non-metallic appearance. In some aspects, the second side of the fabric may present a matte, soft-textured appearance. In some aspects, the second side of the fabric may be cotton. In some aspects, the fabric may be manufactured in a manner which unifies both sides into what appears to be a single layer, thereby creating a dual-layer appearance effect. In such aspects, dual-layer appearance may be achieved through various manufacturing processes, such as laminating, fusing, or employing adhesive layers, which enable the combination of distinct materials into a seemingly singular fabric.

In some aspects, any layer of any panel may independently include a natural material; a synthetic material; a natural polymeric material; a synthetic polymeric material; a natural fiber; a synthetic fiber; or a combination thereof; wherein the material may be coated or uncoated; and wherein the material may include four-way stretch capability. As used herein, the term "polymeric material" regarding the fabric refers to a substance or compound comprising large molecules made up of a series of repeating subunits, known as monomers. The monomers within a polymer can be the same, or they can be different, resulting in copolymers or terpolymers, among others. Polymeric materials can be naturally occurring or synthetically produced. As used herein, the term "four-way stretch capability" refers to the inherent property of a material, typically a fabric, to exhibit elastic deformability in both the warp and weft directions, allowing the material to stretch and recover both longitudinally and laterally. This capability enables the material to adapt and conform to multidirectional forces or movements, providing enhanced flexibility and fit.

In some aspects, any layer of any panel may independently include acetate, acrylic, aramid, chenille, Cordura™ (the product nylon and polyester fabrics sold under the trademark Cordura™), Coolmax™ (the product polyester fabric sold under the trademark Coolmax™), cotton, elastane, flannel, fleece, Gore-Tex™ (the product expanded polytetrafluoroethylene sold under the trademark Gore-Tex™), jersey, Kevlar™ (the product para-aramid synthetic fiber sold under the trademark Kevlar™), Lycra™ (the product elastane sold under the trademark Lycra™), microfiber, Modal™ (the product rayon sold under the trademark Modal™), muslin, neoprene, Nomex™ (the product meta-aramid sold under the trademark Nomex™), nylon, olefin, Orlon™ (the product acrylic fiber sold under the trademark Orlon™), polyester, polyester blends, polyethylene, polypropylene, polyvinyl, rayon, satin, silk, suede cloth, Supplex™ (the product nylon fabric sold under the trademark Supplex™), Tactel™ (the product polyamide fiber sold under the trademark Tactel™), Taslan™ (the product textured nylon sold under the trademark Taslan™), Tencel™ (the product lyocell sold under the trademark Tencel™), terry cloth, Zylon™ (poly (p-phenylene-2,6-benzobisoxazole) sold under the trademark Zylon™), velvet, vinyl coated polyester, viscose and combinations thereof.

In some aspects, any layer of any panel may independently include a fabric which is uncoated. In some aspects, any layer of any panel may independently include a fabric with a coating. In various aspects any layer of any panel may independently include a fabric with a polymer coating. In various aspects, the fabric of any panel or layer may include a polymeric material, providing the fabric with certain desired properties as known in the art. In some aspects, any fabric, regardless of composition, may be further treated or coated with a polymer coating to impart additional characteristics or functionalities to the fabric.

In some aspects, the fabric layers may be treated or coated with various substances to enhance their performance characteristics in specific environments. As an example but not intended to limit the present disclosure, some aspects may include a UV-resistant coating applied to the outermost layers. In some aspects, a UV-resistant coating may prevent or reduce damage and discoloration from prolonged exposure to sunlight. In some aspects, a water-resistant or waterproof coating may be applied to protect against rain and other forms of moisture. In some aspects, a water-resistant or waterproof coating may protect the transparent barrier from water spots and potential mineral deposit staining. In some aspects, an anti-microbial coating may be applied. In some aspects, an anti-microbial coating may inhibit the growth of mold, mildew, and other microorganisms. In some aspects, a coating may be applied to prevent or mitigate damage due to airborne debris. In some aspects, this coating serves as a barrier against various environmental elements, including but not limited to dust, sand, leaves, insects, bird droppings, pollen, other particulate matter and combinations thereof. In some aspects, the coating may offer resistance against chemical pollutants, acidic rain, and other corrosive agents present in the atmosphere. In some aspects, the coating may offer protection against vandalism. In various aspects, this protective layer may prolong the lifespan of the fabric. In some aspects, the coating may possess self-cleaning properties, facilitating easy maintenance and reducing the frequency of manual cleaning.

In some aspects, any of the three or four fabric layers may independently be coated with a protective layer that provides additional structural integrity and resistance to environmental factors. In some aspects, the protective layer may be composed of a polymer coating, such as polymers of urethane. In some aspects, the polymer coating protective layer may be composed of polyurethane. In some aspects, a polyurethane layer may provide additional resistance to abrasion, tearing, and environmental degradation. In some aspects, the protective layer may be transparent or may be tinted to provide additional shading and UV protection to the underlying transparent barrier. In some aspects, the coating may be a natural material, a synthetic material, a natural polymer, a synthetic polymer or a combination thereof. In some aspects, the coating may be selected from acrylics and any acrylate polymers, fluoropolymers, melamine, neoprene, polyethylene, polyurethane, polyvinyl chloride (pvc), silicone, Teflon™, vinyls and any vinyl polymers, waxes whether natural or synthetic, and combinations thereof. In some aspects, the coatings may be antimicrobial; antistatic; flame retardant; fusible; matte; metallic; thermal including reflective, absorptive and insulative thermal coatings; waterproof; water-repellent; wicking and combinations thereof. In some aspects, any side of any layer independently may include a vinyl coated polyester.

In some aspects, these coatings may be applied at the time of manufacture. In other aspects, these coatings may be applied at the time of fabrication of the present protective cover. In some aspects, the protective layer may be applied to the fabric through various methods, such as spraying, dipping, or laminating, to ensure a uniform and durable application. The protective layer may be applied to either or both sides of the fabric, depending on the desired performance characteristics and aesthetic preferences.

In some aspects, each layer independently may include a material designed to prevent or reduce damage to the transparent barrier. In some aspects, each layer independently may be selected to protect the transparent barrier from a different type of damage. In some aspects, the two inner layers may be selected to provide the same type of protection to the transparent barrier. In some aspects, the two outer layers may be selected to provide a different protection from the inner two layers. In some aspects, the two outer layers may each independently provide the same protection as the other outer layer.

In some aspects, each layer of the cover may independently include a fabric capable of exhibiting a visually perceptible change in color or luminance when viewed from different angles or lighting conditions. Luminance as used herein means the intensity of light emitted from a surface per unit area in a given direction.

In some aspects, the first layer (110) of the first panel (170) may exhibit a visually perceptible change in color or luminance when the fabric is viewed under varying angles or different lighting conditions. In some aspects, the fourth layer (140) of the second panel (180) may exhibit a visually perceptible change in color or luminance when the fabric is viewed under varying angles or different lighting conditions. In some aspects, a visually perceptible change in color or luminance when the fabric is viewed under varying angles or different lighting conditions may be attributed to the specific weave pattern, the incorporation of specialized fibers, or the use of particular dyes or pigments that interact distinctively with light. In some aspects, a visually perceptible change in color or luminance may enhance the aesthetic appeal of the cover or the particular layer. In some aspects, a visually perceptible change in color or luminance may serve as an additional safety feature by increasing the visibility of the covered transparent barrier under different environmental conditions.

In some aspects, any of the layers may independently include an iridescent fabric. Iridescent as used herein means showing luminous colors that seem to change when seen from different angles. In some aspects, the first layer (110) of the first panel (170) may be constructed from an iridescent fabric. In some aspects, the fourth layer (140) of the second panel (180) may be constructed from an iridescent fabric. Iridescence may allow the fabric to display a spectrum of colors that shift based on the angle of observation or illumination. This optical phenomenon can be a result of the fabric's microstructure, the layering of materials, or the inclusion of specific coatings that refract or reflect light in a manner that produces the iridescent effect. In some aspects, the iridescent fabric may augment the aesthetic elements of the cover or any of the independent layers, but may also provide an added layer of visibility, especially under varying lighting conditions. In some aspects, the iridescent nature of the fabric may be achieved through the use of specific materials, coatings, or manufacturing processes that enhance the fabric's interaction with light. In some aspects, iridescent fabric may include holographic coatings, knitting with iridescent threads, lamination of thin films, layering fabrics with different refractive indices, multi-layered polyester films, pearlescent coatings, thin layers of metals or metal oxides, weaving with iridescent threads and combinations thereof.

Figure 3A:
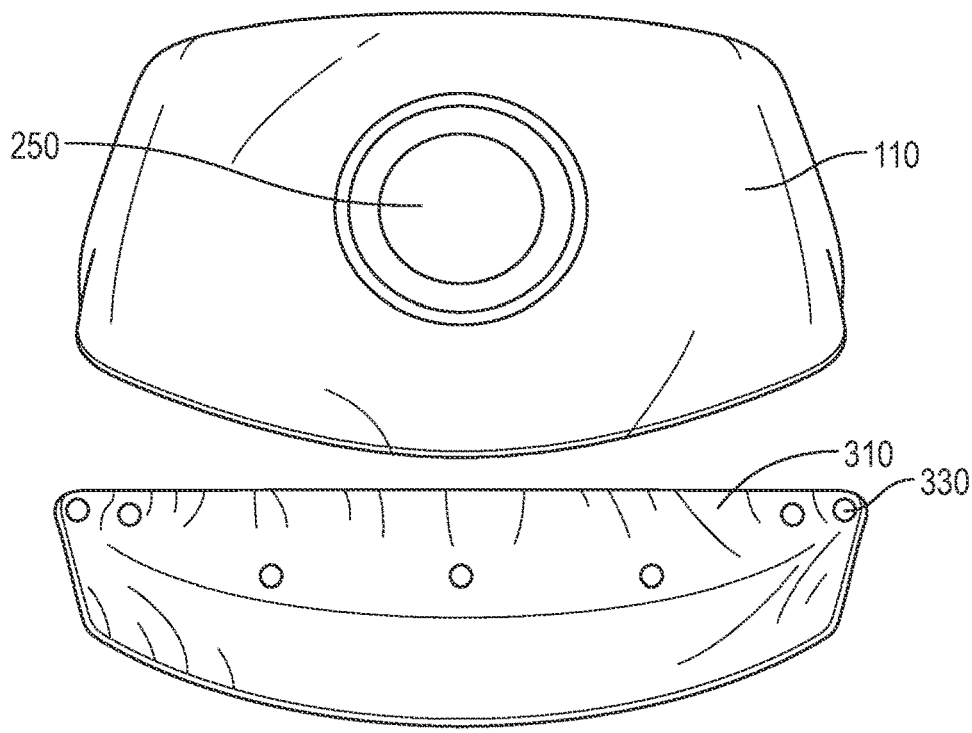
FIG. 3A shows a front view of the present disclosure Including the front view of the optional extender panel.

In FIG. 3A, a front view of the cover is depicted, with the extender mechanism laid separately below it. In some aspects, the extender mechanism, as described herein, refers to a functional component or assembly designed to connect to and thereby adjust the dimensions of the present cover. In various aspects, the extender mechanism refers to a functional component or assembly designed to connect to the first panel (170) of the present cover and elongate or extend the cover in a direction distal to the top portion (210). In further aspects, this mechanism may include an extension or flap which may be selectively attached to the first panel (170) of the present cover. In some aspects, the extender mechanism may allow the user to adjust one or more dimensions of the cover to accommodate differently sized transparent barriers of a vehicle. In some aspects, the extender mechanism may lengthen one or more dimensions of the cover to accommodate differently sized transparent barriers of a vehicle.

In some aspects, the extender mechanism may have a custom shape and custom dimensions based on user input, allowing for adaptability and customization based on the size and shape of a specific transparent barrier or specific desires of the user. In various aspects, the extender mechanism may be configured using fabrics described herein to prevent damage to the transparent barrier.

In some aspects, the extender mechanism includes a first extender layer (310) and a second extender layer (320). In FIG. 3A, the first extender layer (310) is visible, displaying the second attachment feature (330). The first extender layer (310) faces away from the rider. In some aspects, an attachment feature is operatively affixed to the first extender layer (310). In some aspects, various attachment mechanisms may be employed including but not limited to snaps, buttons, zippers, ties, elastic bands, magnetic closures, adhesive tape, glue, or any other suitable attachment means which may facilitate secure and adjustable attachment while accommodating various transparent barrier shapes and sizes.

Figure 3B:
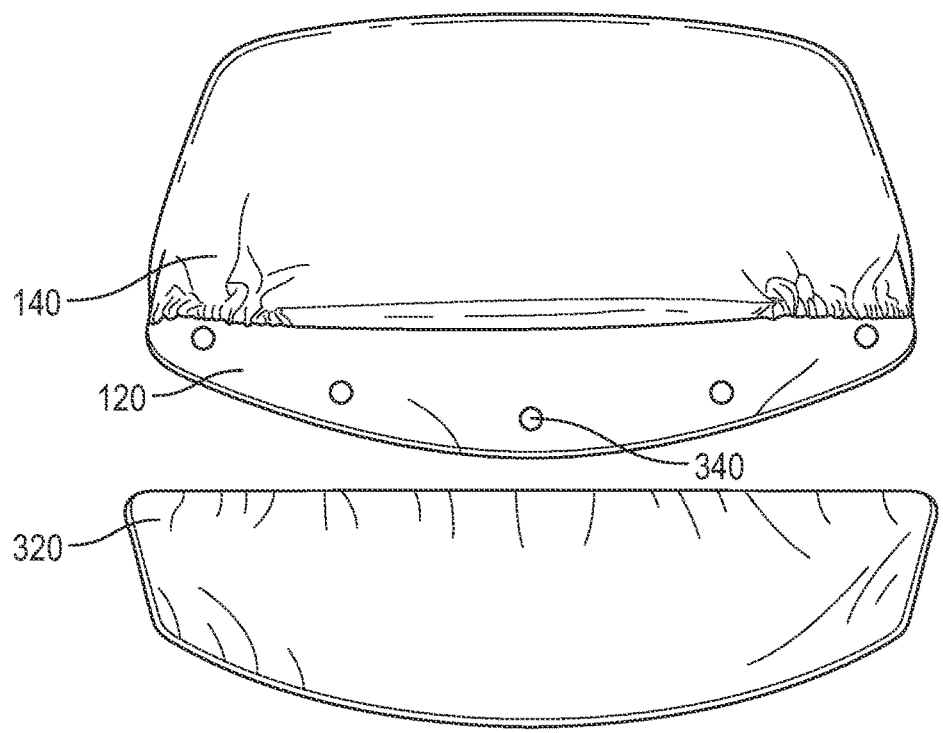
FIG. 3B shows a rear view of the present disclosure including the rear view of the optional extender panel.

FIG. 3B illustrates the rear view of the cover, revealing the second layer (120) of the first panel (170) and the fourth layer (140) of the second panel (180). The extender mechanism is also shown below and separate from the cover, where the second extender layer (320) is visible. The second extender layer (320) faces the rider. The second layer (120) of the first panel (170) is shown in FIG. 3B with the first attachment feature (340) depicted. In some aspects, the first attachment feature (340) may be operatively affixed to the second layer (120) of the first panel (170). In some aspects, the first attachment feature (340) may be operatively affixed to the second layer (120) of the first panel (170) by sewing, gluing, taping, employing adhesive or sealant layers, utilizing a melting process to amalgamate the fabrics and/or materials, stitching, welding, riveting, snap fastening, buttoning, zipping, hook and loop fastening, bonding, laminating, tying, magnetic fastening, pinning, buckling, taping, grommeting, Velcro strapping, clipping, toggle fastening, basting, fusing and combinations thereof. In some aspects, the first attachment feature (340) may be selected from, but not limited to, stitches, glue, adhesive tape, sealant layers, melted amalgamations, stitch patterns, welds, rivets, snaps, buttons, zippers, hooks, loops, bonds, laminates, ties, magnets, pins, buckles, tapes, grommets, clips, toggles, basting threads, fusions, and combinations thereof.

In some aspects, the first attachment feature (340) may be operatively affixed to the second layer (120) of the first panel (170) such that it is aligned in registration with the second attachment feature (330) on the first extender layer (310). The term "aligned," as used herein refers to the deliberate and exact positioning of the first attachment feature (340) and the second attachment feature (330) on different layers or components such that they align and/or match in registration when brought into contact. This alignment can facilitate a seamless integration of the extender mechanism with the cover, optimizing the functionality and aesthetics of the overall design. "In registration," as used in the art, denotes the precise alignment and positioning of the first attachment feature (340) and the second attachment feature (330) such that they correspond directly and that they securely engage when brought into contact. This registration ensures a seamless integration of the extender mechanism with the cover, enhancing both its functionality and aesthetic appeal.

In some aspects, the first attachment feature (340) on the second layer (120) of the first panel (170) may be strategically positioned such that, when overlaid with the first extender layer (310), it corresponds precisely or in registration to a complementary second attachment feature (330) on the said first extender layer (310), As shown in FIGS. 3A and 3B, the cover shown in FIG. 3B may be flipped over to the position shown in FIG. 3A and connected to the first extender layer (310) of the extender mechanism such that the first attachment feature (340) is brought into secure contact with the second attachment feature (330). In various aspects, this strategic positioning may ensure the first attachment feature (340) and the complementary second attachment feature (330) are in registration with one another, facilitating a secure and effective and selective engagement.

Figure 4:
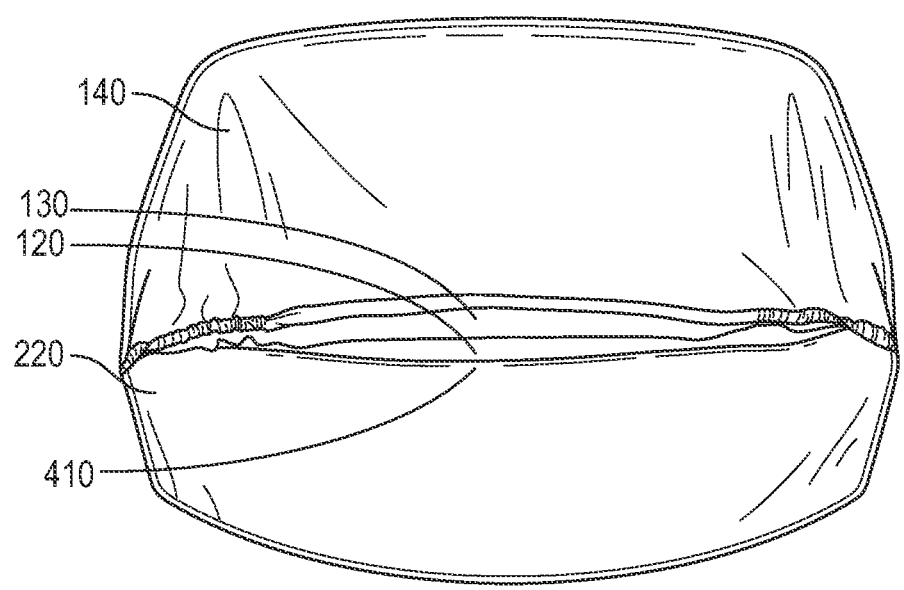
FIG. 4 shows a rear view of one aspect of the present disclosure including the optional extender panel attached to the present cover.

In FIG. 4, the rear view of the cover with the extender mechanism attached to the cover is shown. The second layer (120) of the first panel (170), the fourth layer (140) of the second panel (180), a small portion of the optional third layer (130) on the second panel (180), and the second extender layer (320) of the extension mechanism are visible. In FIG. 4, a section of the bottom portion of the second panel (180) has been lifted up to expose the optional third layer (130) and the attachment of the extender mechanism to the present cover. The location of attachment (410) of the extender mechanism to the second layer (120) of the first panel (170) is indicated. FIG. 4 shows an example of various aspects where the first attachment feature (340) on the second layer (120) of the first panel (170) is operatively engaged in registration with the second attachment feature (330) on the first extender layer (310) of the extender mechanism.

In some aspects, the second attachment feature (330) may be operatively affixed to the first extender layer (310) of the extender mechanism. In some aspects, the second attachment feature (330) may be operatively affixed to the first extender layer (310) of the extender mechanism by sewing, gluing, taping, employing adhesive or sealant layers, utilizing a melting process to amalgamate the fabrics and/or materials, stitching, welding, riveting, snap fastening, buttoning, zipping, hook and loop fastening, bonding, laminating, tying, magnetic fastening, pinning, buckling, taping, grommeting, Velcro strapping, clipping, toggle fastening, basting, fusing and combinations thereof. In some aspects, the second attachment feature (330) may be selected from, but not limited to, stitches, glue, adhesive tape, sealant layers, melted amalgamations, stitch patterns, welds, rivets, snaps, buttons, zippers, hooks, loops, bonds, laminates, ties, magnets, pins, buckles, tapes, grommets, clips, toggles, basting threads, fusions, and combinations thereof.

In various aspects, the first attachment feature (340) on the second layer (120) of the first panel (170) may be configured to selectively engage with the second attachment feature (330) on the first extender layer (310) of the extender mechanism. In some aspects, the first attachment feature (340) and the second attachment feature (330) may be of the same type to ensure secure engagement between the two. In various aspects, the first attachment feature (340) and the second attachment feature (330) may be complementary in nature to ensure secure engagement between the two. In some aspects, the first attachment feature (340) may include a hook component of a hook and loop fastening system. In various aspects, the second attachment feature (330) may be the corresponding loop component of a hook and loop fastening system. In other aspects, the first attachment feature (340) may be the loop component of a hook and loop fastening system while the second attachment feature (330) may correspondingly be the hook component of the same system. In other aspects, if the first attachment feature (340) includes a button, the second attachment feature (330) may include a corresponding buttonhole designed to receive and secure said button. In other aspects, the first attachment feature (340) may be a male snap component and the second attachment feature (330) may be the complementary female snap component. In other aspects, the first attachment feature (340) may be a female snap component and the second attachment feature (330) may be the complementary male snap component. In other aspects, the first attachment feature (340) may be one side of a zipper mechanism and the second attachment feature (330) may be the complementary side of the zipper, ensuring the two may interlock and provide a secure closure. In various aspects, the attachment mechanisms may include but are not limited to hook and loop fasteners, snaps, buttons, zippers, ties, elastic bands, magnetic closures and combinations thereof.

In some aspects, the first extender layer (310) and second extender layer (320) may be overlaid in registration with one another. In other aspects, piping (160) or a similar element may be placed proximal to the periphery of said overlaid first extender layer (310) and second extender layer (320). In some aspects, an operative amount of fabric from the first extender layer (310) and the second extender layer (320) may extend beyond the piping (160) in order to fold said first extender layer (310) and the second extender layer (320) over the piping (160). In further aspects, the peripheral portion of the overlaid first extender layer (310) and the second extender layer (320) may be folded over the piping (160). In other aspects, the overlaid first extender layer (310) and the second extender layer (320) may be operatively affixed proximal to the internal edge of the piping (160), thereby establishing a seam proximal to the piping (160). In some aspects, the piping (160) edge along the periphery of the first extender layer (310) and second extender layer (320) overlaid in registration may impart structural integrity to the extender mechanism. In other aspects, the piping (160) may impart a finished aesthetic look to the extender mechanism. In some aspects, the first extender layer (310) and the second extender layer (320) may initially be operatively affixed together. In some aspects, the two affixed layers, the first extender layer (310) and the second extender layer (320), may subsequently be folded over the piping (160). In other aspects, the two affixed layers, the first extender layer (310) and the second extender layer (320), folded over the piping (160) may then be subjected to an additional affixing process adjacent to the piping (160) to create a finished look with improved structural support. In some aspects, the piping (160) may be optional and may not be incorporated into the construction of the extender mechanism.

In some aspects, a piece of piping (160) may be affixed along the periphery of the first extender layer (310) and the periphery of the second extender layer (320), wherein the first extender layer (310) and the second extender layer (320) may be in registration with one another. In some aspects, the piping (160) may be affixed along the periphery of the first extender layer (310) and the second extender layer (320), specifically located between the first extender layer (310) and the second extender layer (320). In some aspects, the piping (160) may be located proximal to the periphery of the first extender layer (310) and the second extender layer (320). In further aspects, the peripheral portion of the overlaid he first extender layer (310) and the second extender layer (320) may be folded around the piping (160). In other aspects, the overlaid fabric may be sewn proximal to the internal edge of the piping (160), thereby establishing a seam proximal to the piping (160). In some aspects, the piping (160) edge along the periphery of the first extender layer (310) and the second extender layer (320) may impart structural integrity to the extender mechanism. In other aspects, the piping (160) may impart a finished aesthetic look.

FIG. 3A further displays an optional aesthetic element (250) which may be positioned and operatively affixed independently to the front panel (first panel (170)) and/or the rear panel (second panel (180)). In some aspects, the aesthetic element (250) may be a logo, as shown, but may also encompass various other aesthetic indicia, including but not limited to designs, patterns, images, text or other descriptions, or other visual elements. In various aspects, the aesthetic element (250) may be custom-designed based on user-provided input and/or measurements and may be formed from a variety of materials and may be coated or uncoated. In some aspects, said user-provided input and/or user-provided measurements may be in various forms, including but not limited to digital files, physical templates, drawings, photographs, descriptive narratives and combinations thereof. The aesthetic element may be created from a variety of materials known in the art including but not limited to natural fiber, synthetic fiber, natural leather, synthetic leather, natural stones, natural gems, synthetic stones, synthetic gems, natural material, synthetic material, polymeric material, plastic material, metallic material, fluorescent material, reflective material, and combinations thereof, wherein the aesthetic element may be coated or uncoated.

In some aspects, any portion of any one or more aesthetic elements independently may include a coating. In some aspects, the one or more aesthetic elements may be treated or coated with various substances to enhance their performance characteristics in specific environments. As an example but not intended to limit the present disclosure, some aspects may include a UV-resistant coating which may prevent or reduce damage and discoloration from prolonged exposure to sunlight. In some aspects, a water-resistant or waterproof coating may be applied to protect against rain and other forms of moisture which may protect the one or more aesthetic elements from water spots and potential mineral deposit staining. In some aspects, an anti-microbial coating may be applied which may inhibit the growth of mold, mildew, and other microorganisms. In some aspects, a coating may be applied to prevent or mitigate damage due to airborne debris. In some aspects, this coating serves as a barrier against various environmental elements, including but not limited to dust, sand, leaves, insects, bird droppings, pollen, other particulate matter and combinations thereof. In some aspects, the coating may offer resistance against chemical pollutants, acidic rain, and other corrosive agents present in the atmosphere. In some aspects, the coating may offer protection against vandalism. In various aspects, this protective layer may prolong the lifespan of the aesthetic element. In some aspects, the coating may possess self-cleaning properties, facilitating easy maintenance and reducing the frequency of manual cleaning.

In some aspects, any of the optional one or more aesthetic elements may independently be coated with a protective layer which provides additional structural integrity and resistance to environmental factors. The protective layer may be composed of a polymer, such as polyurethane. In some aspects, a polyurethane layer may provide additional resistance to abrasion, tearing, and/or environmental degradation. In some aspects, the protective layer may be transparent or may be tinted to provide additional shading and UV protection to the optional one or more aesthetic elements. In some aspects, the coating may be a natural material, a synthetic material, a natural polymer, a synthetic polymer or a combination thereof. In some aspects, the coating may be selected from acrylics and any acrylate polymers, fluoropolymers, melamine, neoprene, polyethylene, polyurethane, polyvinyl chloride (pvc), silicone, sealant, Teflon™, vinyls and any vinyl polymers, waxes whether natural or synthetic, and combinations thereof. In some aspects, the coatings may be antimicrobial; antistatic; flame retardant; fusible; matte; metallic; thermal including reflective, absorptive and insulative thermal coatings; waterproof; water-repellent; wicking and combinations thereof.

In some aspects, these coatings may be applied at the time of manufacture. In other aspects, these coatings may be applied before, during and/or after the time of fabrication of the present protective cover. In some aspects, the protective layer may be applied to the one or more aesthetic elements through various methods, such as spraying, dipping, laminating and combinations thereof, to ensure a uniform and durable application.

In some aspects, the present cover may be custom-fit to a specific transparent barrier. In some aspects, this custom fitment provides a precise fit of the cover to a specific transparent barrier. In some aspects, this custom fitment is achieved by utilizing user-provided measurements of the specific transparent barrier. In various aspects, the said user-provided measurements may be used to construct the first panel (170) and/or the second panel (180) of the cover, ensuring each independently conforms to the user-provided dimensions and contours of the specific transparent barrier. In some aspects, the extender mechanism, if present, may also be constructed based on said user-provided measurements. In various aspects, the extender mechanism when present may further enhance the adaptability and precise fit of the cover to the user-provided dimensions and contours of the specific transparent barrier. In some aspects, the extender mechanism may allow the user to adjust one or more dimensions of the cover to accommodate differently sized transparent barriers of a vehicle.

In some aspects, there may be synergy between the one or more elastic features (150) and the custom-fit design. In some aspects, the synergy between the one or more elastic features (150) and the custom-fit design may create a precise fit of the cover on the transparent barrier. In various aspects, the combination of the one or more elastic features (150) and the custom-fit design may provide a cover which fits precisely over the transparent barrier. In some aspects, the combination of the custom-fit and the one or more elastic features (150) may be designed to replicate the shape and size of the transparent barrier, ensuring a precise fit. In some aspects, the combination of the custom-fit and the one or more elastic features (150) may facilitate rapid, accurate and/or efficient placement and rapid and/or efficient removal of the present cover. In some aspects, users may easily place the cover over the barrier and remove it as needed, while being assured of the precise and tailored positioning of the present cover on the transparent barrier. In some aspects, the combination of the custom-fit and the one or more elastic features (150) may facilitate rapid, accurate and/or efficient placement of the cover. In various aspects, the combination of the custom-fit and the one or more elastic features (150) may facilitate rapid and/or efficient removal of the present cover.

In some aspects, the custom-fit of the present cover when combined with the one or more elastic features (150) may offer protection against potential displacements. In various aspects, the present cover may remain fixedly in place during challenges including but not limited to gusty winds, heavy rain, or other adverse weather conditions, wherein the transparent barrier may be provided with augmented positional stability and protection. In some aspects, the specific fit in combination with the one or more elastic features (150) may secure the cover against displacement during wind, rain, and other adverse weather conditions. In some aspects, the combination of the precise fit of the cover with the one or more elastic features (150) may ensure the transparent barrier remains shielded from external elements, prolonging its lifespan and maintaining its clarity.

In some aspects, only the one or more elastic features (150) may be required to provide a precise fit of the present cover over the transparent barrier. In various aspects, the one or more elastic features (150) alone may be designed to replicate the shape and size of the transparent barrier, ensuring a precise fit. In some aspects, the one or more elastic features (150) alone may facilitate rapid, accurate and/or efficient placement and rapid and/or efficient removal of the present cover. In some aspects, due to the presence of the one or more elastic features (150), users may easily place the cover over the barrier and remove it as needed, while being assured of the precise and tailored positioning of the present cover on the transparent barrier.

In some aspects, only the presence of one or more elastic features (150) may offer protection against potential displacements. In various aspects, the present cover may remain fixedly in place during challenges including but not limited to gusty winds, heavy rain, or other adverse weather conditions, wherein the transparent barrier may be provided with augmented positional stability and protection specifically due to the one or more elastic features (150). In some aspects, the one or more elastic features (150) may ensure the transparent barrier remains shielded from external elements, prolonging its lifespan and maintaining its clarity.

In some aspects, the transparent barrier is a windshield. In other aspects, the transparent barrier is a face shield, for example on a motorcycle helmet, or a protective face shield used in medical or industrial settings. In other aspects, the transparent barrier may be selected from a gazebo with clear panels, display case panels for example in stores or museums, glass balconies, terrace barriers and combinations thereof.

In some aspects, the vehicle including a transparent barrier is a motorcycle. In other aspects, the vehicle may be selected from an aircraft, ATV (all-terrain vehicle), boat, bus, car, construction equipment, golf cart, helicopter, jet skis (or other personal watercraft), light rail vehicles, paramotors (powered paragliders), recumbent bicycle including fully-faired or semi-faired recumbent bicycle, riding lawn mower, snowmobile, drone (or other unmanned aerial vehicle), streetcar or tram, tractor, truck, UTV (utility task vehicle), window or viewport on any submersible craft, window or viewport on any spacecraft and combinations thereof.

In some aspects, the transparent barrier is a windshield and the vehicle is a motorcycle. In various aspects, the disclosure provides a method for protecting a transparent barrier of a vehicle. In some aspects, the disclosure provides a method for protecting the windshield of a motorcycle.

In various aspects, the disclosure provides a method for protecting a transparent barrier of a vehicle. Step one of this method includes the provision of a cover. In some aspects, the cover may be specifically designed with features which cater to the specific needs of the transparent barrier, ensuring optimal protection against external conditions and elements. Step two of the protective method may include placing the cover over the transparent barrier. In some aspects, this placement may be facilitated by an opening, which may be strategically formed by the operative connection between the first panel (170) and the second panel (180) of the cover.

In various aspects, elements included in the fabrication of the cover may allow that the cover can be easily positioned over the transparent barrier without any cumbersome adjustments or alignments. In some aspects, the combination of the custom-fit and the one or more elastic features (150) may facilitate rapid, accurate and/or efficient placement and rapid and/or efficient removal of the present cover. In some aspects, users may easily place the cover over the barrier and remove it as needed, while being assured of the precise and tailored positioning of the present cover on the transparent barrier. In some aspects, the combination of the custom-fit and the one or more elastic features (150) may facilitate rapid, accurate and/or efficient placement of the present cover. In various aspects, the combination of the custom-fit and the one or more elastic features (150) may facilitate rapid and/or efficient removal of the present cover.

In some aspects, one or more elastic features (150) may be incorporated into the design of the cover. In some aspects, the one or more elastic features (150) may facilitate the method of placing the cover over the transparent barrier.

In some aspects, the one or more elastic features (150) may allow the cover to stretch and adapt its shape, accommodating barriers of varying shapes and sizes. In various aspects, this stretch and adaptability may ensure that users can install the cover without the need for additional tools or assistance. In some aspects, the stretch and adaptability may allow users to install the cover quickly. In some aspects, the stretch and adaptability may allow users to install the cover using only one hand.

In some aspects, the incorporation of one or more elastic features (150) may ensure the cover conforms precisely to the contours and dimensions of the transparent barrier, providing a precise fit. In some aspects, this precise fit may enhance the aesthetic appeal of the covered transparent barrier. In some aspects, the precise fit may also allow that portions or all of the transparent barrier may be adequately shielded and/or protected.

In various aspects, step three of the method may include allowing the cover to remain positioned for a duration determined by the user. In some aspects, this user-determined quantity of time can vary based on the specific needs or circumstances faced by the user. In some aspects, a user might choose to keep the cover on for minutes, overnight, during a storm, during a sunny day, or for extended periods when the vehicle is not in use or while the vehicle is in storage. In some aspects, during this time period where the cover remains in position, the cover may serve to shield the transparent barrier, either in its entirety or a specific portion, from a range of environmental conditions or external elements. Such conditions might include, but are not limited to, rain, snow, hail, dust, debris, ultraviolet (UV) light or ultraviolet (UV) radiation, scratches, vandalism, and other potential hazards. In some aspects, the protective properties of the cover may ensure that the transparent barrier remains free from damage, wear, or degradation that might otherwise result from prolonged exposure to these conditions or elements.

In some aspects, step four of the method may include removal of the cover from the transparent barrier. In some aspects, this removal may be facilitated by an opening, which may be strategically formed by the operative connection between the first panel (170) and the second panel (180) of the cover. In various aspects, elements included in the fabrication of the cover, such as one or more elastic features (150), may allow that the removal process of removing the cover from the transparent barrier may be straightforward and efficient as defined by the user. In various aspects, one or more elastic features (150), may facilitate rapid and/or efficient removal of the cover from the transparent barrier. In various aspects, the removal process may require no or minimal need for the user to undo or reverse any prior adjustments or alignments made during the placement of the cover. In some aspects, the cover may be lifted off the transparent barrier without necessitating intricate maneuvers or reconfigurations. In some aspects, design features in the cover, such as the one or more elastic features (150) which may allow stretch and adaptability, may allow users to remove the cover using only one hand. In some aspects, design features in the cover, such as the one or more elastic features (150) which may allow stretch and adaptability, may allow the cover to be easily removed without causing any damage to the transparent barrier or to the cover itself.

What is claimed is:

1. A cover for a transparent barrier, the cover comprising:
   a. a first panel comprising:
      i. a first layer;
      ii. a second layer, wherein a periphery of the first layer is operatively affixed to the periphery of the second layer;
   b. a second panel comprising:
      i. an optional third layer;
      ii. a fourth layer;
      iii, wherein the optional third layer, when present, is operatively affixed to the fourth layer;
   c. wherein the first panel and the second panel are operatively connected along their peripheries, including at a bottom portion located distally from a top portion, at least at a portion of a bottom of a side edge, and wherein portions of the first panel and the second panel remain unaffixed, thereby creating an opening specifically designed to facilitate placement and removal of the cover over the transparent barrier;
   d. wherein the first layer, the second layer, the optional third layer, and the fourth layer each independently and optionally comprise a polymeric material and/or the polymeric material with a polymer coating; and
   e. wherein at least one of the first layer, the second layer, the optional third layer, and the fourth layer comprises a material and/or coating which prevents or resists degradation from environmental factors including ultraviolet (UV) light, moisture, and airborne debris and/or vandalism.

2. The cover of claim 1, wherein each layer independently comprises a material selected from the group consisting of: a natural material; a synthetic material; a natural polymeric material; a synthetic polymeric material; a natural fiber; a synthetic fiber; and combinations thereof; wherein the material may be coated or uncoated; and wherein the material may include four-way stretch capability in at least one of the layers.

3. The cover of claim 1, wherein the first layer, the second layer, the optional third layer, and the fourth layer each independently comprise a material designed to prevent or reduce damage to the transparent barrier.

4. The cover of claim 1, wherein the second layer and the optional third layer comprise a vinyl coated polyester.

5. The cover of claim 1, wherein the second panel comprises a fabric selected from polyester, elastane, cotton, vinyl coated polyester and combinations thereof.

6. The cover of claim 1, wherein the second layer of the first panel and the optional third layer of the second panel are independently selected from polyester, nylon, and combinations thereof.

7. The cover of claim 1, wherein the polymer coating on at least one of the first layer, the second layer, the optional third layer, and the fourth layer is a polymer of vinyl and/or urethane.

8. The cover of claim 1, wherein the second layer comprises a first attachment feature which allows selective engagement with an extender mechanism, wherein the extender mechanism lengthens one or more dimensions of the cover to accommodate a differently sized transparent barrier of a vehicle.

9. The extender mechanism of claim 8, wherein the extender mechanism comprises a first extender layer and a second extender layer, wherein the first extender layer comprises a second attachment feature which allows selective engagement with the first attachment feature on the second layer, and wherein the second extender layer is configured to prevent damage to the transparent barrier.

10. The extender mechanism of claim 9, wherein the extender mechanism is selectively attachable to the second layer of the first panel via a plurality of attachment mechanisms selected from the group consisting of: hook and loop fasteners, snaps, buttons, zippers, ties, elastic bands, magnetic closures and combinations thereof.

11. The cover of claim 1, wherein the first layer of the first panel further comprises an aesthetic element, wherein the aesthetic element is formed from a material selected from the group consisting of: natural fiber, synthetic fiber, natural leather, synthetic leather, natural stones, synthetic stones, natural gems, synthetic gems, natural material, synthetic material, polymeric material, plastic material, metallic material, fluorescent material, reflective material, and combinations thereof, wherein the aesthetic element may be coated or uncoated.

12. The cover of claim 11, wherein the aesthetic element is custom-designed based on user-provided input, wherein said user-provided input comprises a design, logo, or other aesthetic indicia provided by a user in a form selected from the group consisting of digital files, physical templates, drawings, photographs, descriptions and combinations thereof.

13. The cover of claim 1, further comprising:
   a. the second panel having a top portion and a bottom portion, wherein the top portion is located distal to the opening formed by the bottom portion; and one or more elastic features disposed along a section of the bottom portion; the one or more elastic features being positioned proximal to a first side edge and a second side edge of the second panel and not extending across an entirety of the bottom portion, thereby forming a non-elasticized central section along the bottom portion of the second panel; and
   b. optional piping affixed along the periphery of the cover, wherein the piping is affixed between the first panel and the second panel along the periphery at the operative connection between the first panel and the second panel; and affixed along the opening, wherein the bottom portion of the second panel is folded around the piping, wherein the piping provides additional support and stability to the cover, and optionally wherein the one or more elastic features are affixed to the piping along the first side edge and second side edge of the second panel.

14. The cover of claim 13, wherein the one or more elastic features secure the cover to the transparent barrier, maintain positional stability of the cover during use and facilitate rapid, accurate and/or efficient placement and rapid and/or efficient removal of the cover by providing adaptive fitment to various transparent barrier shapes and sizes.

15. The cover of claim 1, wherein:
 a. said cover is fabricated to precisely fit a specific transparent barrier based on user-provided measurements of said specific transparent barrier;
 b. wherein such fabrication involves the first panel and second panel and optionally an extender mechanism to ensure a precise fit with the transparent barrier;
 c. wherein the precise fit in combination with one or more elastic features facilitates rapid, accurate and/or efficient placement and rapid and/or efficient removal, while maintaining specific positioning on the transparent barrier during placement;
 d. wherein the precise fit in combination with the one or more elastic features secures the cover against displacement during wind, rain, and other adverse weather conditions; and
 e. wherein the precise fit in combination with the one or more elastic features provides augmented positional stability and protection to the transparent barrier.

* * * * *